US009678535B2

(12) United States Patent
Senatori

(10) Patent No.: US 9,678,535 B2
(45) Date of Patent: Jun. 13, 2017

(54) MOVEABLE KEYBOARD LATTICE FOR A PORTABLE ELECTRONIC DEVICE

(71) Applicant: Hewlett-Packard Development Company, L.P., Houston, TX (US)

(72) Inventor: Mark David Senatori, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 26 days.

(21) Appl. No.: 14/761,353

(22) PCT Filed: Jan. 29, 2013

(86) PCT No.: PCT/US2013/023604
§ 371 (c)(1),
(2) Date: Jul. 16, 2015

(87) PCT Pub. No.: WO2014/120120
PCT Pub. Date: Aug. 7, 2014

(65) Prior Publication Data
US 2015/0316959 A1 Nov. 5, 2015

(51) Int. Cl.
*G06F 1/16* (2006.01)
*G06F 3/02* (2006.01)
(52) U.S. Cl.
CPC .......... *G06F 1/1618* (2013.01); *G06F 1/1666* (2013.01); *G06F 3/0208* (2013.01); *G06F 3/0221* (2013.01)
(58) Field of Classification Search
CPC .... G06F 1/1616; G06F 1/1618; G06F 1/1666; G06F 1/1622; G06F 3/0208;
(Continued)

(56) References Cited

U.S. PATENT DOCUMENTS 5,949,643 A 9/1999 Batio
6,314,274 B1 * 11/2001 Kumagai ............ H04M 1/0214
361/679.13
(Continued)

FOREIGN PATENT DOCUMENTS

KR 2007-0079519 A 8/2007
TW M439836 U1 10/2012
WO WO-2012/044279 A1 4/2012

OTHER PUBLICATIONS

Dan Ackerman, "A Full-Time Laptop Meets a Part-Time Tablet," 2013, pp. 1-14, CBS Interactive Inc.
(Continued)

*Primary Examiner* — Hong Zhou
(74) *Attorney, Agent, or Firm* — HP Patent Department

(57) ABSTRACT

Embodiments of the present invention disclose a moveable keyboard lattice frame for a portable electronic device. According to one embodiment, the portable electronic device includes a display housing and a base housing. The base housing is attached to the display housing via hinge members and also includes a keyboard input area comprising of a plurality of input keys. Furthermore, a moveable keyboard lattice frame is formed within the base housing and includes key openings corresponding with positions of the plurality of input keys. Moreover, the keyboard lattice frame is configured to rise and lower based on rotational movement of the display panel and hinge members.

17 Claims, 6 Drawing Sheets

(58) Field of Classification Search
CPC .... G06F 3/0221; G06F 1/1669; G06F 1/1681; G06F 1/181; G06F 3/0202; G06F 3/0219; G06F 3/021; G06F 3/0216
See application file for complete search history.

(56) References Cited

U.S. PATENT DOCUMENTS

| | | |
|---|---|---|
| 7,506,152 B2 | 3/2009 | Parks et al. |
| 7,706,137 B2 | 4/2010 | Iijima et al. |
| 8,102,647 B2 | 1/2012 | Bhutani et al. |
| 2003/0193419 A1* | 10/2003 | Hsu ................ G06F 1/1616 341/22 |
| 2004/0090742 A1 | 5/2004 | Son et al. |
| 2005/0002158 A1 | 1/2005 | Olodort et al. |
| 2005/0058492 A1 | 3/2005 | Hirsch |
| 2011/0053651 A1* | 3/2011 | Miyashita ......... G06F 1/1616 455/566 |
| 2012/0030930 A1 | 2/2012 | Theobald et al. |
| 2013/0322011 A1 | 12/2013 | Yeh |

OTHER PUBLICATIONS

International Search Report and Written Opinion, International Application No. PCT/US2013/023604, Date of Mailing: Oct. 29, 2013, pp. 1-13.

* cited by examiner

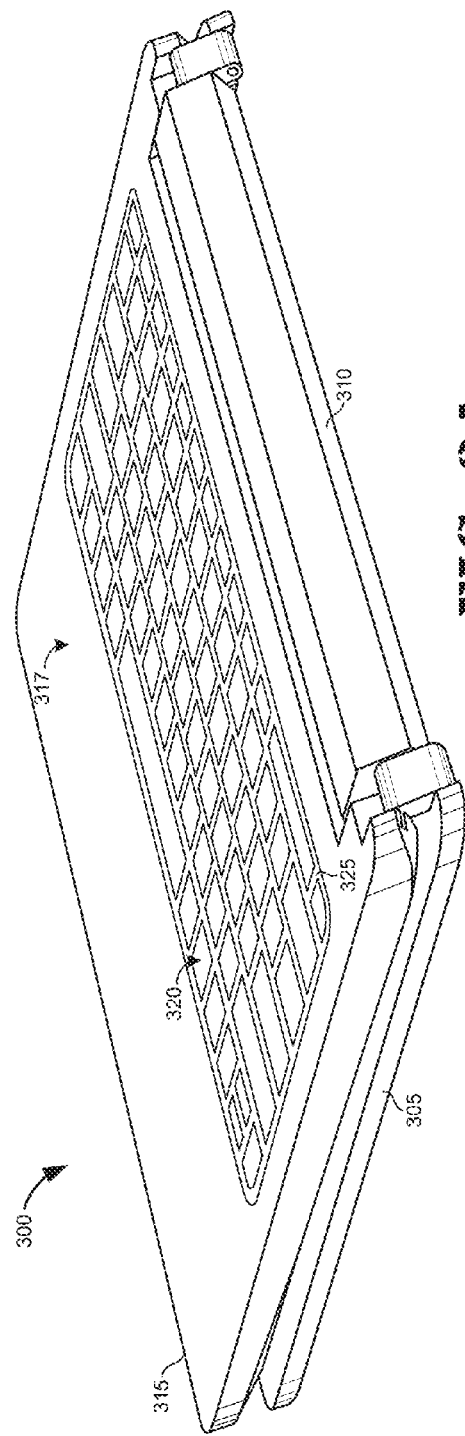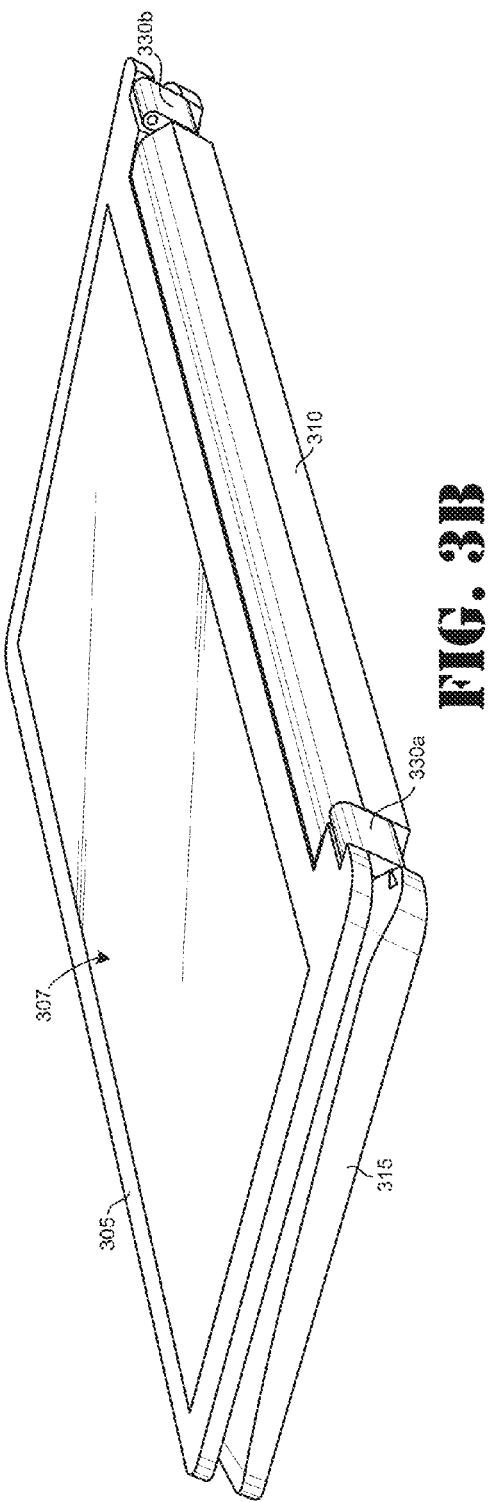

MOVEABLE KEYBOARD LATTICE FOR A PORTABLE ELECTRONIC DEVICE

BACKGROUND

The emergence and popularity of mobile computing have made portable electronic devices, due to their compact design and light weight, a staple in today's marketplace. Many portable electronic devices employ a clam-shell type design such as notebook computers, netbooks, tablet personal computers, and certain handheld devices. Generally, a clam-shell design consists of two housings connected together at a common end. In most cases, an upper housing is utilized to provide a viewable display to a user while a second housing includes an area for accepting user input.

On the other hand, tablet computers and similar handheld devices generally feature a single touchscreen display for both displaying images and accepting user input via a virtual onscreen keyboard for example. Convertible tablets computers are aimed to offer both the portability of a tablet computer and the enhanced functionality of standard notebook computer through some type of conversion technique. However, providing a seamless and efficient conversion method between the notebook and tablet modes has proven difficult such that either one or both modes fail to provide an authentic user experience.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIGS. 3A and 3B are three-dimensional perspective bottom and top views of a portable electronic device in a tablet operating mode according to an example of the present invention.

DETAILED DESCRIPTION OF THE INVENTION

Figure 1A:
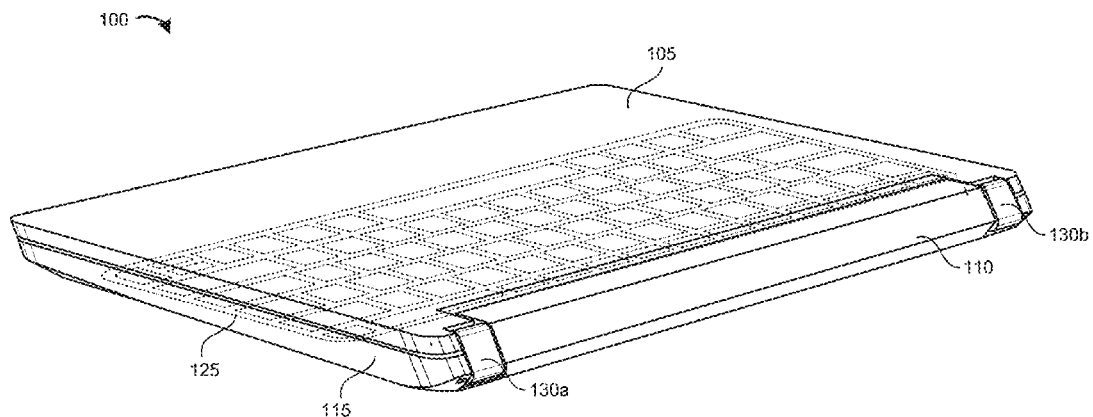
FIGS. 1A and 1B are three-dimensional perspective views of a portable electronic device having a moveable keyboard lattice according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, element 115 in FIG. 1A may reference a similar element 215 in FIG. 2A. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

In convention al convertible notebook computers, the keyboard ends up on the bottom of the unit when in tablet mode. While in this orientation, the user's hands or forearm often come into contact with the keys of the keyboard, and thus fails to provide a solid feel for the user. Moreover, the user may also inadvertently depress a key that undesirably activates some function on the device. Other solutions use a software-only solution to prevent the keys from becoming activated accidentally when held in the tablet orientation. However, this is not an effective remedy to the problem as the keys may still physically move through contact on the lower surface. Still other solutions utilize a touch keyboard that uses capacitive or resistive technology for facilitating keyboard movement. However, there is no haptic feedback provided from such a keyboard and therefore these touch keyboards fail to provide the response and feel that users expect from a traditional keyboard operation. Thus, there is a need in the art for a convertible electronic device that, when in the tablet orientation, provides a flush keyboard bottom surface that prevents movement of the input keys while also providing standard keyboard input functionality when in the traditional clam-shell orientation.

Embodiments of the present invention disclose a moveable key lattice frame for a dual-mode portable electronic device. According to one example embodiment, the display panel of the notebook computer is configured to fold back around on itself one-hundred eighty degrees so as to convert from a first operating mode (claim-shell orientation) into a second operating mode (tablet orientation). When in the second operating mode, the keyboard input area lies on the bottom of the system and the keyboard lattice frame translates upward towards the input surface until the keyboard lattice frame is flush with said surface. More particularly, the keyboard lattice frame provides a solid and robust feel while in tablet operating mode while also locking and preventing any inadvertent presses on the input keys of the keyboard.

Figure 1B:
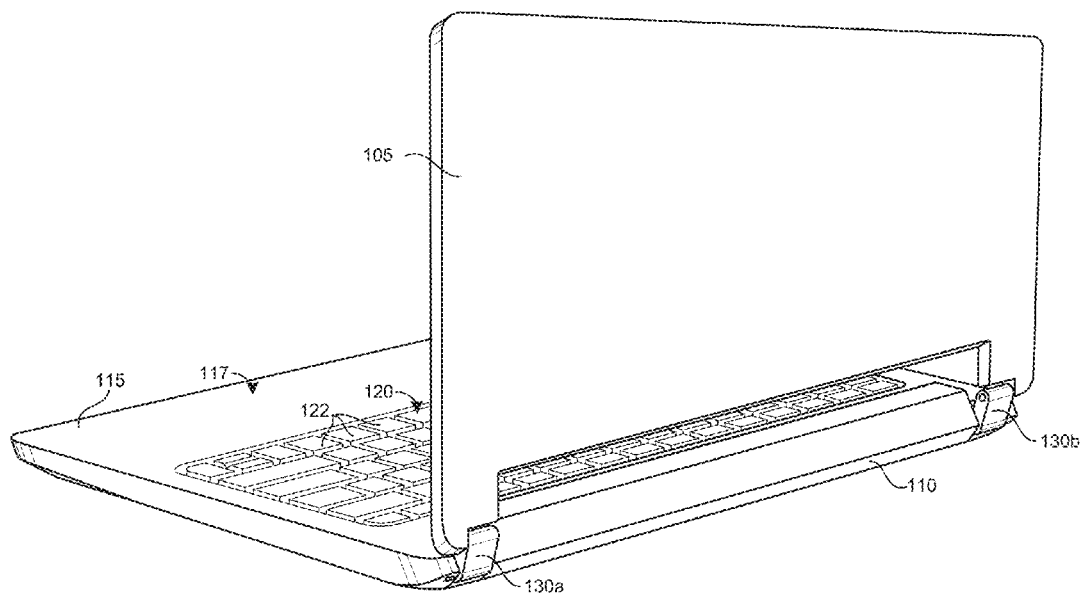

Referring now in more detail to the drawings in which like numerals identify corresponding parts throughout the views, FIGS. 1A and 1B are three-dimensional perspective views of a portable electronic device having a moveable keyboard lattice according to an example of the present invention. As shown in the present example, the portable electronic device 100 includes an upper display panel 105 and a lower base housing 115. The upper display panel 105 and base housing 115 are coupled to each at a common end via hinge portions 130a and 103b. A battery unit 110 for powering the portable electronic device 100 is positioned near the common end of the display panel 105 and base housing 115 and between the hinge portions 130a and 130b. Still further, a keyboard lattice frame 125 is fixed into the chassis of the base housing 115. According to one example embodiment shown in FIG. 1B, the keyboard input area 120 and input keys 122 associated therewith remain in a fixed position, thus providing a stable typing base for the operating user. Such a configuration also allows for the necessary electrical connections to be made in a traditional way without modifications for permitting additional movement. In addition, the input keys 122 are formed such that a topmost surface of each input key 122 is flush with the top surface 117 of the base housing. Such a configuration provides a completely flush surface 117 when the device 100 is placed in tablet orientation and the keyboard lattice frame 125 raises to the key input surface 120 as will be explained in further detail below. While in clam-shell orientation of FIG. 1B, the keyboard lattice frame 125 is lowered within the base housing 115 and keyboard input area 120 is exposed for easy operation and typing input on the input keys 122 by the user.

Figure 2A:
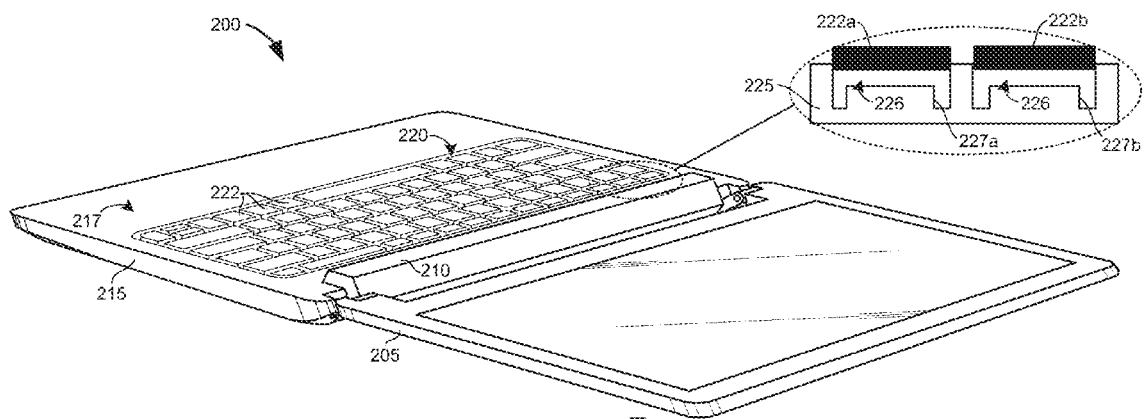
FIGS. 2A and 2B are three-dimensional perspective views of a portable electronic device transitioning from a first operating mode to a second operating mode according to an example of the present invention.
Figure 2B:
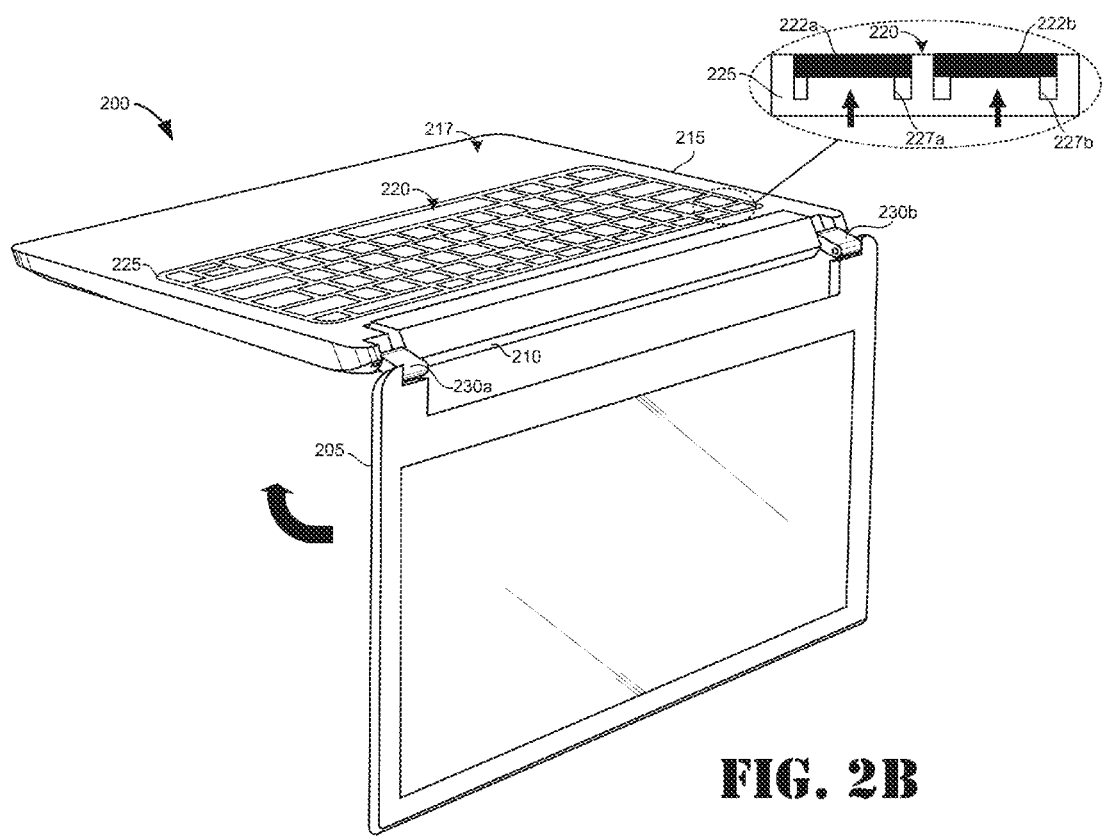

FIGS. 2A and 2B are three-dimensional perspective views of a portable electronic device transitioning from a first operating mode to a second operating mode according to an example of the present invention. As shown in the example embodiment of FIG. 2A, the display panel 205 of the device 200 is moved and lowered from an upright position to a position away from the keyboard input area 220 so as to lie horizontally adjacent to the base housing 215. Also, the battery module 210 lies in a raised position when the keyboard lattice frame 225 is lowered within the base housing 215. In accordance with the example of FIG. 2B, the display panel 205 continues to rotate via the hinge portions 230a and 230b such that the display panel 205 lies perpendicular to the base housing 215. Contemporaneously, such actuation causes the battery module 210 to lower while the key lattice frame 225 rises so as to lie flush with the input keys 222 of the keyboard input area 220 and the base housing upper surface 217. According to one example, and as shown in the enlarged side view (dotted lines), the lattice frame 225 also includes a lip or holding portion (e.g., 227a and 227b) formed around each key opening 226 that extends out under each input key (e.g., 222a and 222b). As the lattice frame 225 moves towards the input surface 220, the holding portion 227a, 227b comes into contact with the bottom edge of each associated input key 222a, 222b so as to prevent the adjacent key from moving when the device 200 transitions to the tablet mode as shown in FIG. 2B. However, these holding portions do not have to be formed below each key of the keyboard as the manufacturers or user may require that one or more input keys still function while in tablet mode. In such instance, the holding portions (e.g., 227a and 227b) may be removed from a particular key opening 226.

FIGS. 3A and 3B are three-dimensional perspective views of a portable electronic device in a tablet operating mode according to an example of the present invention. FIG. 3A is a bottom view of the portable electronic device 300 when in the tablet orientation or operating mode. As shown here, the display housing 305 lies immediately adjacent to base housing 315. That is, the display housing 305 and the base housing 315 are vertically-aligned in the tablet orientation such that both the key input surface 320 and the display surface (307 in FIG. 3B) are exposed to the user. More particularly, the key lattice frame 325 and battery module 310 are substantially flush with the key input area 320 and upper surface 317 of the base housing 315. In accordance with the example embodiment described herein, the key lattice frame 325 serves to place the input keys 322 in a locked position so as to prevent any inadvertent depression or key input by the operating user. FIG. 3B depicts a top view of the portable electronic device 300 while in the table operating mode. Here, the display panel 305 and associated display surface 307 have completely rotated three-hundred sixty degrees about the hinge portions 330a and 330b from a closed position to open and visible (i.e., display 307) position immediately adjacent to the base housing 315. Accordingly, the user may then operate the portable electronic device via touch-based input on the associated display surface 307. Still further, the battery module 310 and hinge portions 330a and 330b are flush with the display surface 307 so as to provide a solid and robust feel while in the depicted tablet orientation.

Figure 4:
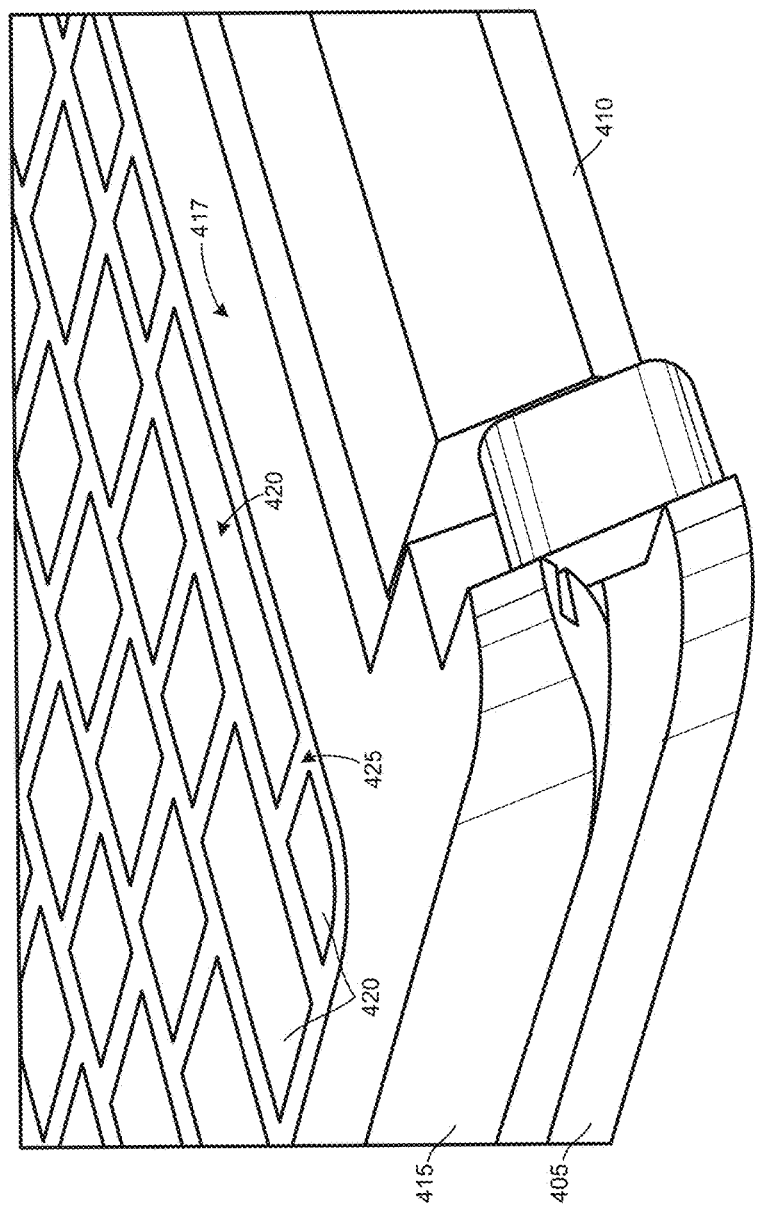
FIG. 4 is an enlarged three-dimensional view of the portable electronic device and keyboard input surface while in a tablet orientation according to an example of the present invention.

FIG. 4 is an enlarged three-dimensional view of the portable electronic device and keyboard area while in a tablet orientation according to an example of the present invention. When in the tablet operating mode, the display panel 405 and the base housing 415 are positioned immediately adjacent to each other such that a rear surface of the base housing 405 (surface opposite upper surface 417) abuts the a rear surface of the display panel 405 (surface opposite display surface shown in FIG. 3B). In accordance therewith, the key lattice frame 425 rises towards the input surface 420 so as to fill the gap areas between in the input keys 420. The battery module 410 also articulates downward with rotation of the hinges such that a top surface of the battery module is substantially flush with the top surface 417 of the base housing 415, the keyboard lattice frame 425 and the keyboard input surface 420. Since all these elements lie flush with one another, the lower side or key input side of the portable electronic device (when in tablet orientation) feels like an entire flat surface as the user holds the device while providing touch-based input on the opposite display surface side of the device.

Figure 5A:
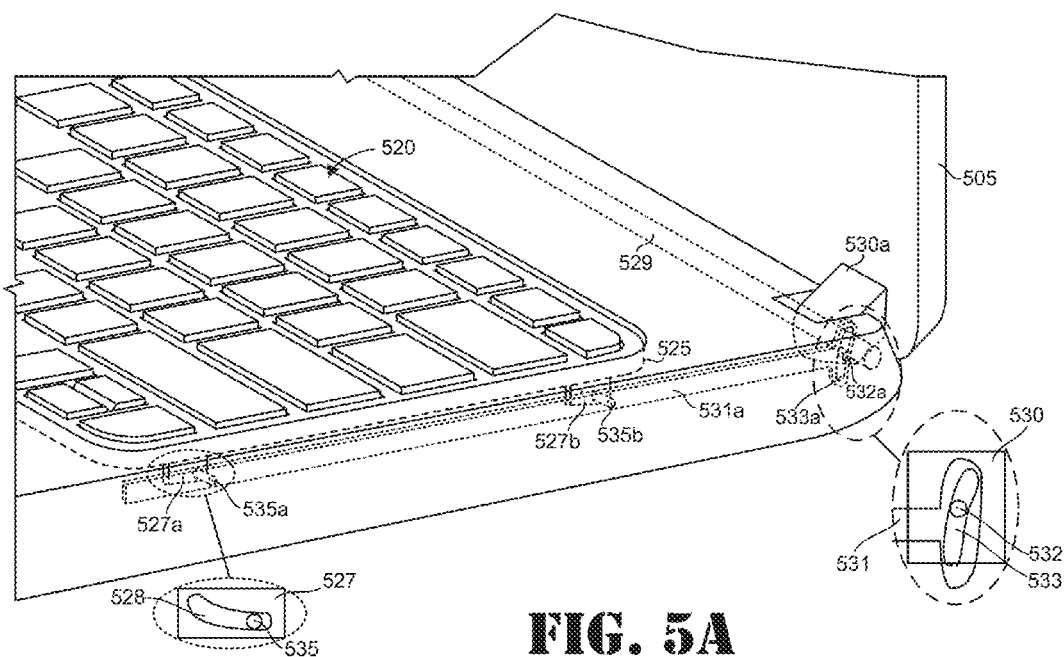
FIGS. 5A and 5B are sectional views of the keyboard lattice frame and keyboard input area when in a clamshell orientation according to an embodiment of the present invention.
Figure 5B:
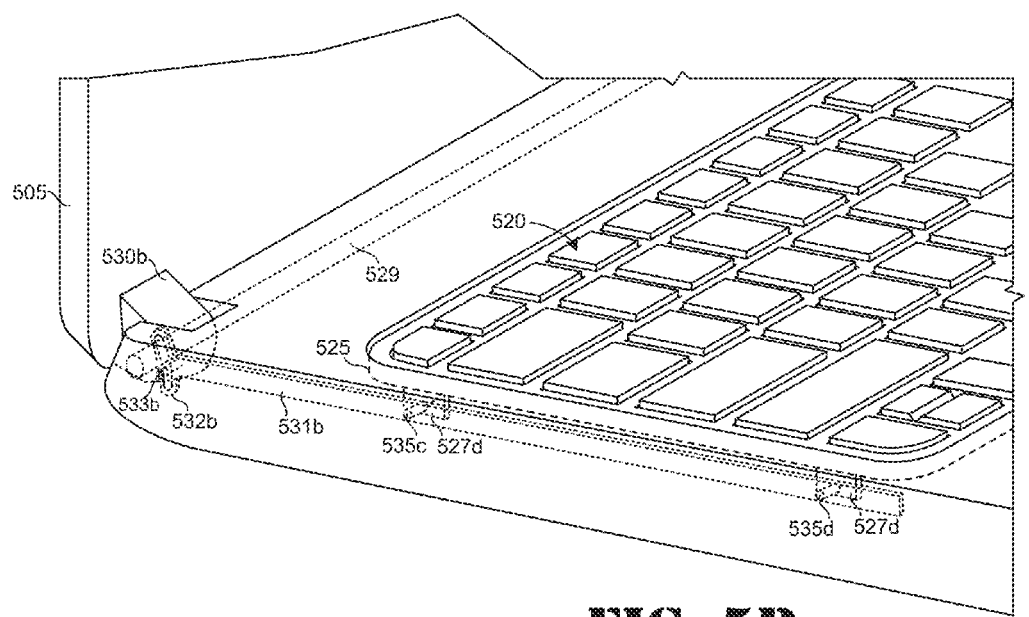

FIGS. 5A and 5B are sectional views of the keyboard lattice frame and keyboard input area when in a clamshell orientation according to an embodiment of the present invention. Translation of the device from the clam-shell orientation to the tablet orientation is achieved through use of a cam system that is tied to the rotation of the hinge portions 530a and 530b. More particularly, movement of the display panel 505 serves to rotate the hinge portions 530a, 530b and push/pull groove portion 533 against a ramp feature 528 associated with the keyboard lattice frame structure 525. According to one example embodiment, these the groove and ramp features 533 and 528 may include a flat section at their upper most point so that any forces applied to them in their final position is against a flat surface and not the ramp section, thus preventing any unwanted movement of the key lattice frame 525. In addition, the key lattice frame 525 may include a spring that helps to pull the lattice frame 525 into the lower position. More particularly, and as well be described below, several guide pins (535a-535d and 532a-532b) are used together with the groove areas 533 and 528 to facilitate translation of the keyboard lattice frame 525.

As shown in FIGS. 5A and 5B (left and right profile views) the movable keyboard lattice 525 includes guide members 527a, 527b and 527c, 527d formed on each side thereof. Moreover, as depicted in the enlarged view of FIG. 5A, each guide member 527 of the keyboard lattice frame 525 includes an inner ramp groove profile 528. A connecting rod 531 includes guide pins 535a-538d (two on each side as shown in FIGS. 5A and 5B) formed within the ramp profile 528 associated with each guide member 527a-527d respectively. Additionally, the connecting rods 531a and 531b include vertical guide apertures 533a and 533b at a position in which each connecting rod 531a, 531b meets the hinge portion 530a and 530b. Moreover, each hinge portion 530a and 530b includes an offset guide pin 532 that rests within the groove or guide aperture 533 of the connecting rod 531 and facilitates movement of the connecting rod 531 and in turn, the keyboard lattice frame 525. According to the present example, the guide pins 532a, 532b are configured to move along the vertical axis maintained by the slightly sloped guide aperture 533a, 533b so as to force forward movement of the connecting rod 531 as the hinge portion 530a, 530b rotates in a clockwise direction.

Figure 6A:
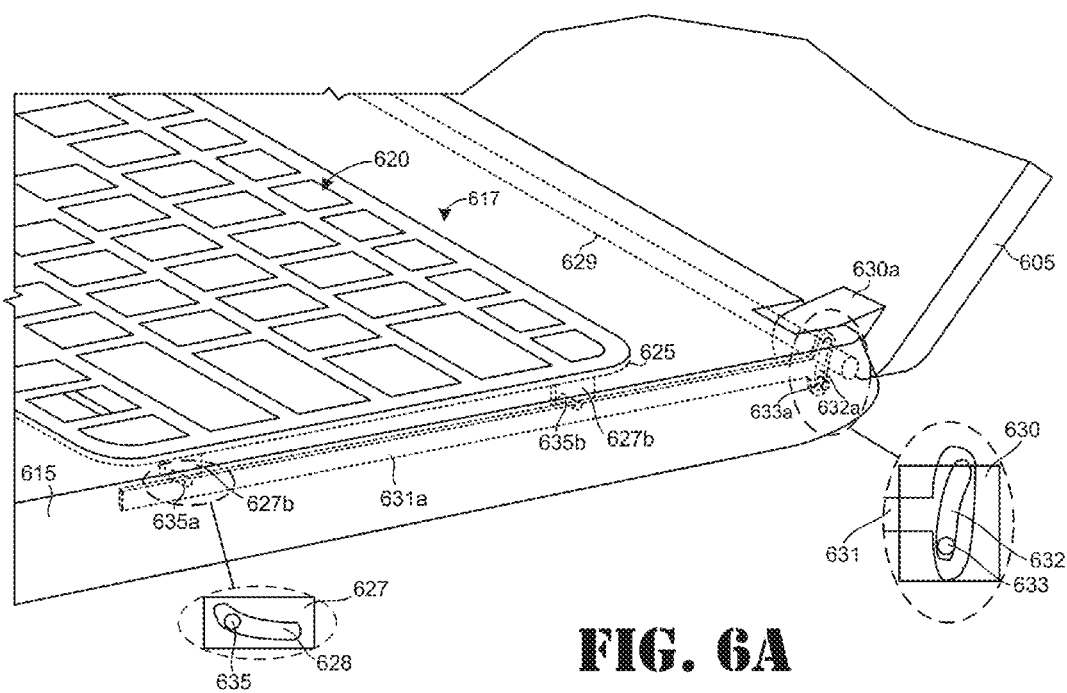
FIGS. 6A and 6B are sectional views of the portable electronic device and keyboard lattice frame while transitioning from a first to a second operating mode according to an embodiment of the present invention.
Figure 6B:
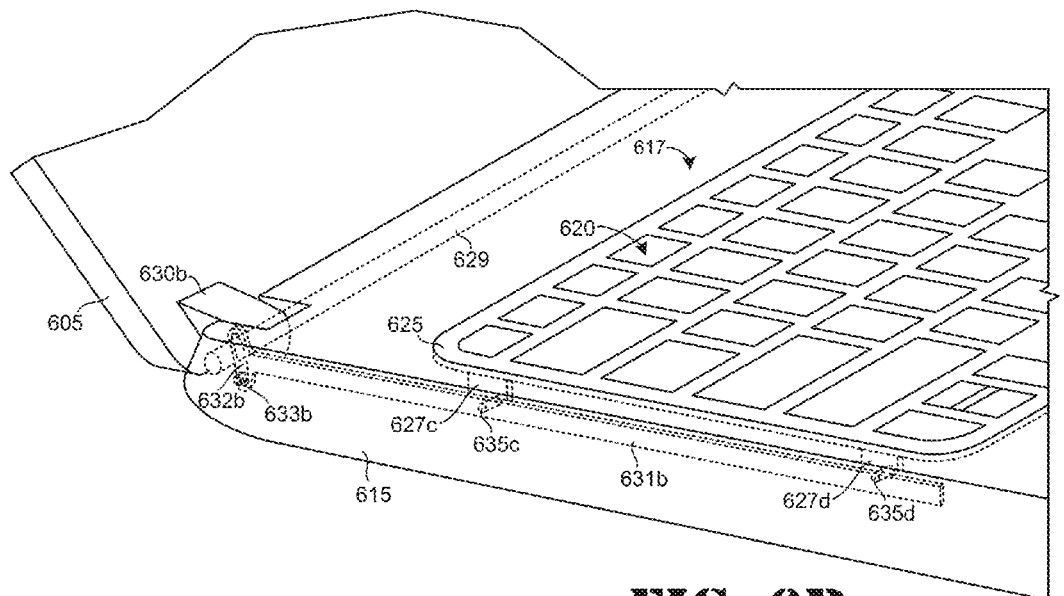

FIGS. 6A and 6B are sectional views of the portable electronic device and keyboard lattice frame while transitioning from a first to a second operating mode according to an embodiment of the present invention. That is, as display panel 605 and the attached hinges 630a, 630b are rotated clockwise away from the keyboard surface 620 about axis 629 as shown in the left and right views of FIGS. 6A and 6B. Additionally, hinge guide pins 633a, 633b move forward which serves to force the connecting rod 631 to move forward as well. More particularly, as the connecting rod 631 moves forward toward an opposite end of the hinge connection end (i.e., common end joining the base housing and display housing), the guide pins 635a-635d positioned within the ramp groove 628 of each guide member 627a-627d of the keyboard lattice frame 625 are forced to move forward in the same direction (i.e., away from the common end). Accordingly, such actuation causes the guide members 627a-627d to rise horizontally and push the keyboard lattice frame 625 into the input surface area 620. As shown in the present examples, the keyboard lattice frame 625 ultimately becomes flush with the keyboard input surface 620 and upper surface 617 of the base housing upon complete rotation and translation of the display panel 605 into the tablet orientation.

Examples of the present invention provide a moveable key lattice frame for a convertible portable electronic device. Moreover, many advantages are afforded by the moveable keyboard lattice structure in accordance with implementations of the present invention. For instance, when operating the convertible portable electronic device in a tablet operating mode, the user essentially feels only a flat surface on the bottom area of the notebook rather than a plurality of haptic input keys. As such, the operating user truly feels as though they are using a tablet device rather than a tablet/notebook hybrid having a full-sized keyboard affixed on the bottom surface as in prior solutions. Still further, when the system is used in the first operating or clamshell mode, the traditional keyboard is still present and gives the user the familiar typing experience. As such, the moveable keyboard lattice frame described herein serves to provide a robust and aesthetically pleasing design for a convertible portable electronic device.

Furthermore, while the invention has been described with respect to exemplary embodiments, one skilled in the art will recognize that numerous modifications are possible. For example, although exemplary embodiments depict a notebook computer as the portable electronic device, the invention is not limited thereto. For example, the portable electronic device may be a netbook, a smartphone device, or any other electronic device having a clam shell housing arrangement and capable of dual-mode orientation.

Moreover, not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement o order of elements or other features illustrated in the drawings or described herein need not be arranged in the particular way illustrated and described. Many other arrangements are possible according to some embodiments.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A portable electronic device comprising:
   an upper housing having a display;
   a base housing having an input area and attached to the upper housing at a common end with hinge members, wherein the input area includes a keyboard input surface comprising a plurality of input keys; and
   a moveable keyboard lattice frame formed within the base housing and having openings corresponding with positions of the plurality of input keys,
   wherein the keyboard lattice frame is moveable between a lowered position and a raised position based on rotational movement of the upper housing and hinge members, and wherein the keyboard lattice frame is moveable between the lowered position and the raised position while the plurality of input keys remain stationary.

2. The portable electronic device of claim 1, where in the upper housing of the portable electronic device is rotatable from a first operating mode to a second operating mode.

3. The portable electronic device of claim 2, wherein the plurality of input keys are substantially flush with a contact surface of the base housing.

4. The portable electronic device of claim 2, wherein when in the first operating mode, the keyboard lattice frame is positioned within the base housing and below the keyboard input surface.

5. The portable electronic device of claim 4, wherein when in the second operating mode, the keyboard lattice frame is flush with the plurality of input keys of the keyboard input surface.

6. The portable electronic device of claim 2, further comprising a battery module positioned between the hinge members.

7. The portable electronic device of claim 2, wherein the first operating mode is a clam-shell mode of the portable electronic device, and the second operating mode is a tablet mode of the portable electronic device.

8. The portable electronic device of claim 1, wherein the keyboard lattice frame comprises a plurality of holding portions that are positioned under respective input keys of at least a subset of the plurality of input keys, and the plurality of holding portions are moveable, relative to the respective input keys, upwardly and downwardly corresponding to movement of the keyboard lattice frame between the raised position and the lowered position wherein the plurality of holding portions are spaced apart from the respective input keys when the keyboard lattice frame is in the lowered position, and wherein the plurality of holding portions are contacted to the respective input keys when the keyboard lattice frame is in the raised position, to place the respective input keys in a locked position to prevent actuation of the respective input keys.

9. The portable electronic device of claim 8, wherein the plurality of holding portions when spaced apart from the respective input keys of the at least a subset of the plurality of input keys allows actuation of the respective input keys.

10. A portable electronic device comprising:
an upper housing having a display and rotatable from a first operating mode to a second operating mode;
a base housing having an input area and attached to the upper housing at a common end with hinge members, wherein the input area includes a keyboard input surface comprising a plurality of input keys;
a moveable keyboard lattice frame formed within the base housing and having openings corresponding with positions of the plurality of input keys; and
a battery module positioned between the hinge members,
wherein the keyboard lattice frame is configured to rise and lower based on rotational movement of the upper housing and hinge members, and wherein the rotational movement of the upper housing and hinge members from the first operating mode to the second operating mode causes both the battery module to lower and the keyboard lattice frame to rise to the keyboard input surface.

11. The portable electronic device of claim 10, wherein the keyboard lattice frame includes a plurality of holding elements to maintain the plurality of input keys in a fixed position when the upper housing is rotated to the second operating mode.

12. The portable electronic device of claim 10, wherein the first operating mode is a clam-shell orientation and the second operating mode is a tablet orientation.

13. A keyboard lattice frame structure formed within a convertible electronic device having a keyboard and hinges connecting a display panel and a base housing, the keyboard lattice frame structure comprising:
a plurality of key openings corresponding with positions of a plurality of input keys associated with the keyboard; and
a plurality of guide members for engaging with connecting rods coupled to the hinges of the convertible electronic device, wherein each guide member includes a ramp aperture for receiving a guide pin associated with a respective connecting rod of the connecting rods, and wherein each of the hinges includes an offset pin configured to move within a guide aperture formed within a respective connecting rod of the connecting rods,
wherein the keyboard lattice frame structure is configured to rise and lower based on rotational movement of the display panel, and
wherein rotation of the display panel from a clam-shell operating mode to a tablet operating mode causes the hinges to rotate and push the respective offset pin forward within the respective guide aperture of the respective connecting rod such that the guide pins of the connecting rods move and push the guide members and keyboard lattice frame structure towards a keyboard surface of the base housing.

14. The keyboard lattice frame structure of claim 13, further comprising:
a plurality of holding elements formed with the key openings and configured to maintain the plurality of input keys of the keyboard in a fixed position when the display panel is rotated to the tablet operating mode.

15. The keyboard lattice frame structure of claim 13, wherein the guide aperture formed within each connecting rod extends in a vertical direction.

16. A portable electronic device comprising:
a display housing configured to rotate from a clam-shell orientation to a tablet orientation;
a base housing having an input area and coupled to the display housing with hinge members, wherein the input area includes a keyboard input surface comprising a plurality of input keys substantially flush with a contact surface of the base housing; and
a moveable keyboard lattice frame formed within the base housing and having openings corresponding with positions of the plurality of input keys, wherein the keyboard lattice frame is configured to rise and lower based on rotational movement of the display panel and hinge members,
wherein the keyboard lattice frame is positioned within the base housing and below the keyboard input surface when the display housing is positioned in the clam-shell orientation;
wherein the keyboard lattice frame is immediately adjacent and flush with the plurality of input keys of the keyboard input surface when the display housing is positioned in the tablet orientation.

17. The portable electronic device of claim 16, wherein the keyboard lattice frame is moveable between a raised position and a lowered position while the plurality of input keys remain stationary.

* * * * *